Oct. 13, 1953
C. K. STEINS ET AL
2,655,166
DETECTOR VALVE FOR HOT BEARING INDICATING SYSTEMS
Filed April 29, 1950
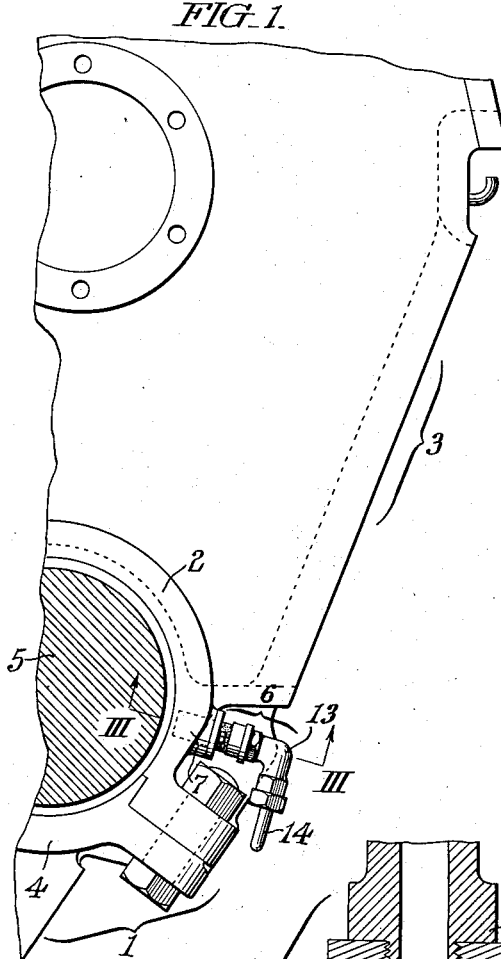
FIG_1.
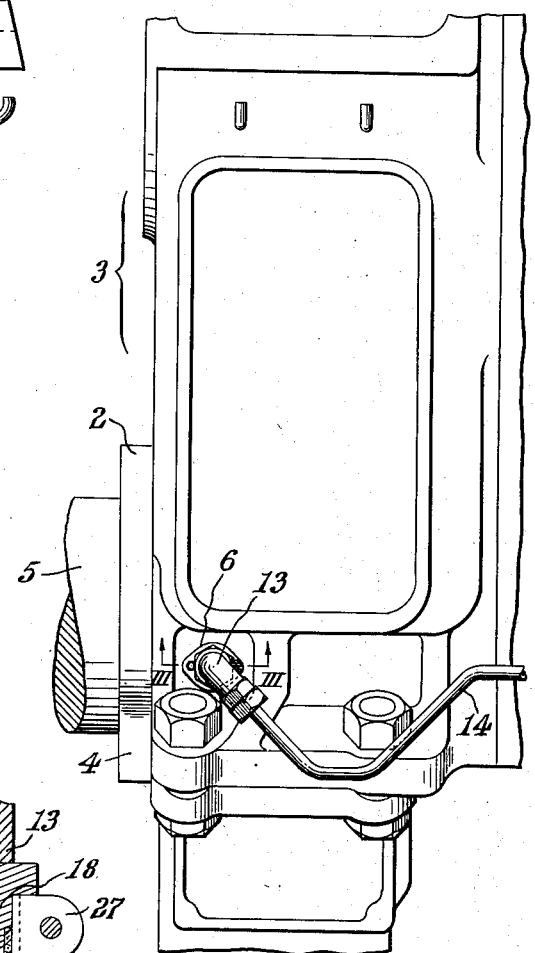
FIG_2.
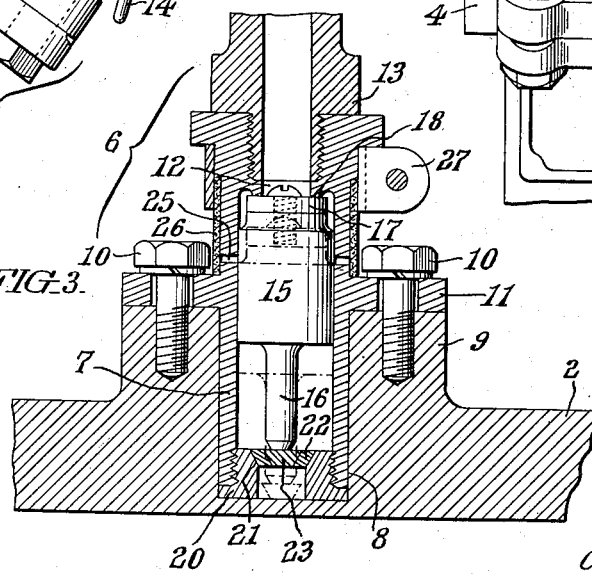
FIG_3.
INVENTORS:
Carleton K. Steins &
William M. Keller
BY Paul and Paul
ATTORNEYS.

Patented Oct. 13, 1953

2,655,166

UNITED STATES PATENT OFFICE 2,655,166

DETECTOR VALVE FOR HOT BEARING INDICATING SYSTEMS

Carleton K. Steins, Overbrook, and William M. Keller, Merion, Pa., assignors to The Pennsylvania Railroad Company, Philadelphia, Pa., a corporation of Pennsylvania Application April 29, 1950, Serial No. 158,978

3 Claims. (Cl. 137—72)

This invention relates to automatic valves useful more particularly in connection with hot bearing indicating systems, wherein audible or other signal devices are operated by release of pressure fluid upon opening of the valves when the bearings become overheated due to lack of adequate lubrication or other causes. Valves of the kind referred to, as ordinarily constructed, are held closed by fusible metallic plugs or stops of relatively large size and bulk, and depend for their operation upon complete melting of these stops. By reason of conduction and radiation in the shaft or axle bearings to which the valves are attached, a considerable temperature gradient obtains between the bearing surfaces and the region of location of the holding stops in the valves. Accordingly with these prior art constructions the alarms are often belated because of the slowness of the stops to melt until after the safe maximum temperature of the bearings was well exceeded.

The chief aim of our invention is to overcome the above pointed out deficiencies of prior art detector valves. This objective is attained in practice, as hereinafter more fully disclosed, through provision of an improved valve, which is held closed by a holding means including a stop of comparatively small bulk which weakens upon rise of the temperature in the bearing to the allowable point and gives away suddenly without actually melting, thereby permitting the valve to open instantly for release of pressure fluid from the system and setting off of the alarm.

Other objects and attendant advantages will appear from the following detailed description of the attached drawings, wherein:

Fig. 1 is a fragmentary view of an axle or shaft bearing structure with a detector valve conveniently embodying my invention.

Fig. 2 is a fragmentary view showing the organization in side elevation; and

Fig. 3 is a fragmentary detail view taken as indicated by the angled arrows III—III in Figs. 1 and 2.

With more detailed reference to these illustrations, the numeral 1 designates the traction motor axle bearing of a diesel electric locomotive chosen for convenience of exemplifying my invention, the upper portion 2 of the bearing being integral with the frame 3 of the motor, and the lower portion 4 being separately formed to permit removal of the axle 5.

The detector valve, with which the present invention is more especially concerned, is comprehensively designated 6, the same having, as shown, a tubular body 7 which is adapted to be recessed part way into a radial socket hole 8 in a thickened portion or boss 9 on the wall of the bearing. The valve 6 is removably secured by means of cap screws 10 whereof the shanks pass through a flange 11 on the body 7 and threadedly engage into said boss as clearly illustrated in Fig. 3. At its outer end, the valve body 7 has an axial inlet port 12 which is internally threaded part way of its length for connection of the terminal elbow fitting 13 of a pipe 14 which may lead from the communicating signal train air line of the locomotive. Disposed within the valve body 7 is a piston-like closure element 15 which has a working fit in the bore of said body, and which is provided with a diametrically reduced axial prolongation 16 at its inner end. To the outer end of the closure element 15 is secured a replaceable gasket or washer 17 of resilient or compressible material, such as rubber, which is adapted to seal with an annular seat 18 around the air inlet port 12.

Threaded into the inner end of the valve body 7 is an axially hollow plug 20 with the inner edge of the opening therein beveled, as at 21, to receive and sustain a relatively thin peripherally beveled stop ring 22 in spaced relation to the bottom of the socket hole 8 in the bearing wall, said ring being fashioned from a soft metal alloy, preferably composed of 50% tin, 25% lead and 25% bismuth or other low melting alloys as required for actuation of the valve at the desired temperature of approximately 350° F. In turn disposed within the axial opening of the ring 22, is a peripherally beveled disk 23 preferably of brass or other relatively hard metal which is directly engaged by the diametrically reduced extension 16 of the closure element 15.

By the means just described, the closure element is normally held in the raised full line position of Fig. 3 covering a small exhaust orifice 25 in the side of the exposed portion of body 7, with the gasket 17 at its outer end firmly engaging the seat 18 around the inlet port 12 of said body. A protective jacket 26 of felt or the like secured about the exposed portion of the valve body by a clamp band 27 prevents entry of dirt into the orifice 25.

If for lack of sufficient lubrication or other cause, the bearing 2 should heat up to a point beyond a safe permissible degree, the ring 22 will yield without actually melting, with consequent immediate displacement of the closure element 15 from its seat under the pressure of the air in pipe 13. Upon complete recession of the closure element 15 to the position in which it is shown in broken lines in Fig. 3, the lateral orifices 25 in the body 7 will be uncovered to permit escape of air from the latter, with attendant reduction in the train line air pressure and actuation of a signal (not shown) in the cab of the locomotive in a manner readily understood by those familiar with such systems.

After the cause of heating of the bearing has been determined and corrected, the valve 6 is removed and restored to its original condition by installing a new ring and disk to hold the closure element in its normal or closed position. It is to be understood that as the plug 21 is drawn up incident to re-assembling of the valve, the gasket or washer 17 is well compressed to effect a good fluid tight seal with the seat 18 around the air inlet port of the body 7. Several of the valves are in practice used for the better protection of a bearing, the number depending of course upon the size and character of the bearing, and being connected in parallel relation to the train line.

Having thus described our invention, we claim:

1. A detector valve, for use in pressure fluid actuated hot bearing signal operating systems, comprising a tubular body adapted to be recessed partway into the wall of the bearing and having means at its outer end for connection of a pressure fluid pipe main; a piston-like closure element normally engaged with an internal annular seat adjacent the outer end of the body and normally covering a lateral bleed port in the protruding portion of the body, said element having a diametrically-reduced axial prolongation at its inner end; a plug engaged in the bore of the body at the inner end and having an axial bore larger in diameter than that of the reduced prolongation of the closure element; and a relatively thin element of fusible material spanning the bore of the plug at the inner end of the latter upon which the reduced prolongation of the closure element normally bears.

2. A detector valve according to claim 1, wherein the inner end of the bore of the plug is beveled; and wherein the fusible element is shaped to fit into the bevel of the plug bore.

3. A detector valve according to claim 1, wherein the inner end of the bore of the plug is beveled; wherein the fusible element is annular and shaped to fit the bevel of the plug bore; and wherein a smaller beveled disk of non-fusible material is set axially into the fusible element for direct contact by the prolongation of the closure element.

CARLETON K. STEINS.
WILLIAM M. KELLER.

References Cited in the file of this patent

UNITED STATES PATENTS

| Number | Name | Date |
| --- | --- | --- |
| 526,921 | Gregg | Oct. 2, 1894 |
| 730,097 | Crawford et al. | June 2, 1903 |
| 1,058,993 | Marvin | Apr. 15, 1913 |
| 1,105,888 | Davis | Aug. 4, 1914 |
| 1,311,774 | Ritter | July 29, 1919 |
| 1,712,116 | Lovekin | May 7, 1929 |
| 1,744,977 | Lovekin | Jan. 28, 1930 |
| 1,877,007 | Meyer | Sept. 13, 1932 |
| 1,983,514 | Lovekin | Dec. 4, 1934 |
| 2,295,154 | Brower | Sept. 8, 1942 |
| 2,420,924 | Whittaker | May 20, 1947 |

FOREIGN PATENTS

| Number | Country | Date |
| --- | --- | --- |
| 567,120 | Great Britain | of 1943 |